United States Patent [19]

Morser et al.

[11] 3,918,045

[45] Nov. 4, 1975

[54] VARIABLE RESOLUTION CONTROL SYSTEM

[75] Inventors: Alfred Harold Morser, Letchworth; Roy Gibson, Biggleswade; Stephen Anthony Scott, Houghton Conquest; Clifford Michael Bailey, Eaton Ford; Ian Keith Taylor, Biggleswade, all of England

[73] Assignee: Cincinnati Milacron Inc., Cincinnati, Ohio

[22] Filed: Nov. 23, 1973

[21] Appl. No.: 418,430

[30] Foreign Application Priority Data

June 25, 1973 United Kingdom ............... 30094/73

[52] U.S. Cl. 340/347 SY; 235/92 MP; 235/151.11; 318/660; 340/147 MT

[51] Int. Cl.[2] G05B 1/06; G05B 19/18; H03K 13/02

[58] Field of Search ..... 235/92 MP, 92 CC, 92 DM, 235/151.11, 154; 340/347 DA, 347 SY, 147 P, 147 MT; 318/660, 659, 661

[56] References Cited

UNITED STATES PATENTS

| | | | |
|---|---|---|---|
| 3,174,367 | 3/1965 | Lukens | 235/92 DN |
| 3,223,830 | 12/1965 | Evans | 235/92 MP |
| 3,624,642 | 11/1971 | Tripp | 340/347 DA |
| 3,648,030 | 3/1972 | Shepherd et al. | 235/92 EV |
| 3,728,607 | 4/1973 | Isak | 235/92 DN |
| 3,764,781 | 10/1973 | Kreithen et al. | 235/92 MP |
| 3,801,803 | 4/1974 | McDaniel | 235/154 |

*Primary Examiner*—Thomas J. Sloyan

[57] ABSTRACT

A digital to analog converter is disclosed which produces analog signals having a phase relationship therebetween which is a function of digital input signals. The digital to analog converter is typically used in control systems for commanding or measuring the motion of a movable element. The converter contains variable modulo counters which permit a scaling of the signals during the conversion process. Consequently, input signals having different resolutions may be programmed in a control system; and the converter will produce command signals for moving the element in accordance with the input signals. Similarly, in a measuring system, the converter may be used to obtain a readout of the motion of the element according to any desired resolution.

11 Claims, 4 Drawing Figures

VARIABLE RESOLUTION CONTROL SYSTEM

BACKGROUND OF THE INVENTION

The invention relates generally to the area of digital to analog converters as used in numerical control systems for controlling the motion of a movable element or for measuring the extent of motion of a movable element. Specifically, the invention provides a phase modulation type of digital to analog converter containing variable modulo counters which permit a scaling of the conversion process.

In a typical phase modulation type of digital to analog (D/A) converter, a reference counter circuit is responsive to a source of clock pulses for dividing the frequency of the clock pulses by a predetermined number (N) to produce an analog reference signal. A command counter circuit is responsive to the clock pulses for dividing the frequency of the clock pulses by said number (N) to produce analog command signals. The second counter circuit contains an add/delete circuit in its first stage for adding or deleting a pulse in response to digital input signals thereby shifting the phase of the command signal with respect to the reference signal.

The above D/A converter is typically associated with a servomechanism having an electro-mechanical feedback unit connected to a movable element. The feedback unit is responsive to the reference signal and to the displacement of said element to produce a feedback signal having a shift in phase relative to the reference signal proportional to displacement. A phase discriminating circuit is responsive to the command signal and the feedback signal and produces an error signal as a function of the difference therebetween. A servomechanism drive circuit is responsive to the error signal so as to drive the element in a manner reducing the error signal to zero.

For simplicity of explanation, attention will only be given to the application of the invention to one axis of motion. Application of the invention to more than one axis of motion involves a mere replication of some parts and a sharing of other parts, such as the clock source, etc. As is well understood in the art, an axis of motion may be either linear or rotational. The nature of the feedback system forms no part of the present invention and any suitable system may be employed.

Typically, in the case of a linear axis, the controlled member is driven by a lead screw geared to a resolver being responsive to the reference signal and providing the feedback signal. One revolution of the resolver corresponds to a pitch (R) which is the product of the pitch of the lead screw (L) times the gear ratio (G) between the lead screw and the resolver. The electrical pitch (E) of the feedback system is the displacement of the controlled member corresponding to one cycle of the feedback signal. The electrical pitch (E) is equal to the pitch of the resolver (R) divided by a factor (P) which is determined by the nature of the resolver. The factor (P) will be equal to one or two depending on whether the resolver is a two-pole or four pole resolver, respectively.

The resolution (B) of the control system is equal to the electrical pitch (E) of the feedback system divided by the predetermined number (N) in the D/A converter. The electrical pitch (E) can readily be ascertained for other types of feedback systems. For example, in the case of linear resolvers, such as an INDUCTOSYN, the electrical pitch is the same as the pitch of the scale of the linear resolver. Historically, a requirement has existed to be able to vary the resolution (B) to work to different tolerances. More recently it has become important to be able to work in both the English and Metric systems of measurement. Several countries of the world are presently involved in converting from the English or inch system to the Metric system, and a long transition period arises in which both systems are inevitably used.

In the past, this requirement has been met by altering the electrical pitch (E). In the case of linear resolvers, this is achieved by mounting both English and Metric resolvers on the same machine. In the case of rotary resolvers, it is only necessary to alter the gear ratio (G); but in practice, separate appropriately geared resolvers have to be provided in order that the transition may be made in a rapid and simple manner. Switching between the different resolvers requires banks of relays which do not merely have to change the resolver connections, but further, have to switch various parameters of the servo-system to suit the different resolutions.

Resolvers are expensive items in themselves, and the whole system becomes very bulky, complex, and expensive by virtue of the duplication of two resolvers for each axis and the associated relay switching circuits. The present invention provides a system which overcomes the above problems. The disclosed invention provides means for varying the predetermined number (N) so as to establish different resolutions (B) for the same electrical pitch (E). Further, in obtaining the different resolutions the frequency of the reference and command signals is maintained constant.

SUMMARY OF THE INVENTION

According to one embodiment of the invention, an apparatus is provided for converting a digital signal to a corresponding analog signal. The apparatus first includes a source of clock pulses. Further, a first frequency dividing means is responsive to the clock pulses for dividing the frequency of the clock pulses by a first predetermined number to produce a control signal of a predetermined frequency. The apparatus includes a second frequency dividing means which is responsive to the control signal and divides the frequency of the control signal by a second predetermined number to produce an analog reference signal. Finally, the apparatus includes a third frequency dividing means which is responsive to the control signal and divides the frequency of the control signal by the second predetermined number to produce an analog command signal. The third frequency dividing means also includes means responsive to the digital signals for changing the phase of the command signal with respect to the reference signal.

DESCRIPTION OF THE PREFERRED EMBODIMENTS

Figure 1:
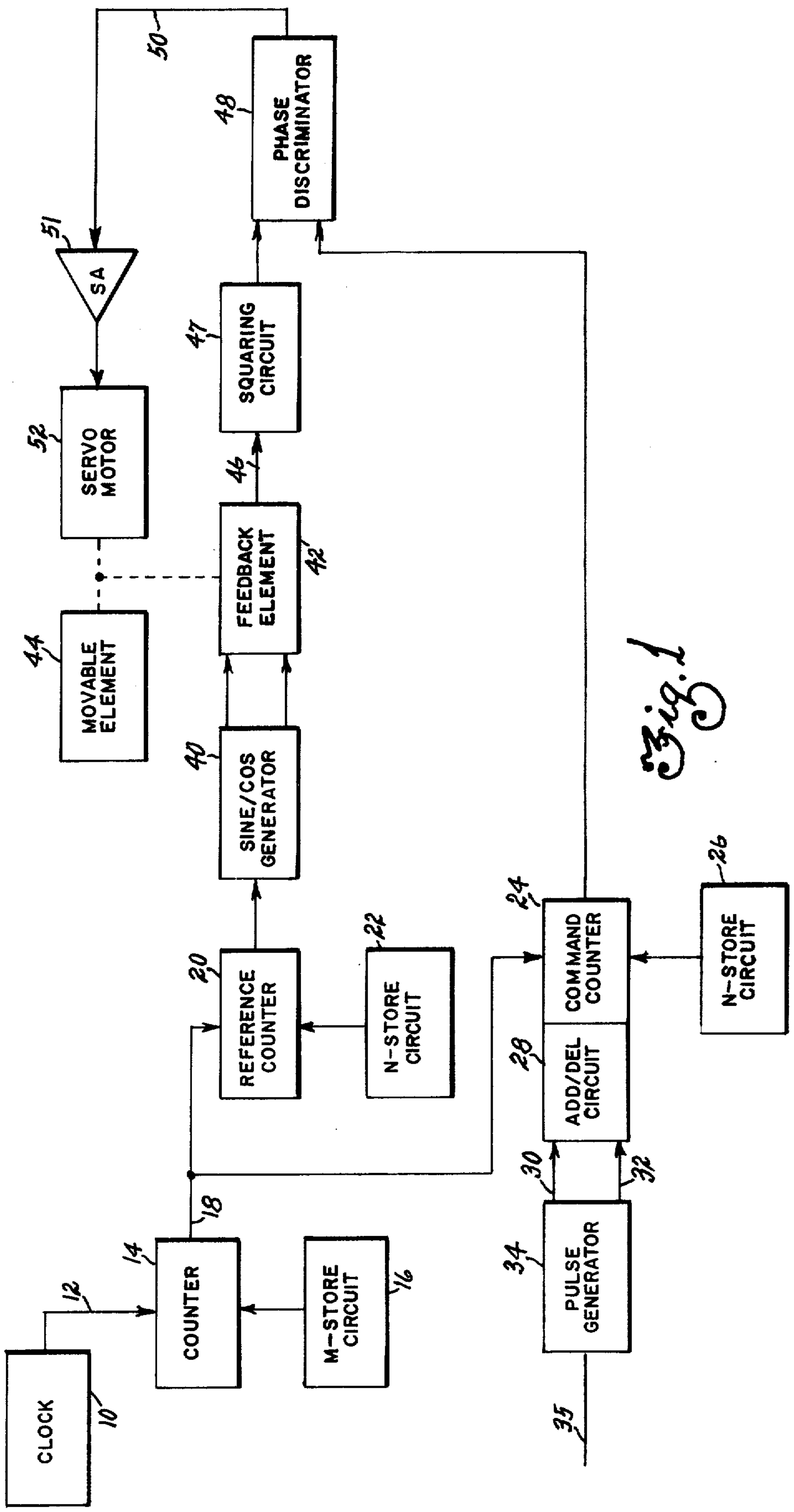
FIG. 1 is a general block diagram basically illustrating the invention as it may be applied in conjunction with a numerical control.

FIG. 1 is a block diagram of a control system embodying the invention for one linear axis of motion. A source of clock pulses 10 is operative to supply said pulses on line 12 to a counter circuit 14. Depending on the resolution desired, the counter 14 is responsive to storage circuits shown at 16 for dividing the frequency of the clock pulses by predetermined number (M). The result of this division is a digital control signal produced on line 18. A reference counter circuit 20 is responsive to the control signal and operates to divide the frequency of the control signal by a second predetermined number (N), contained in the storage circuits 22. The control signal on line 18, also represents a clocking signal for a command counter 24 which is operative to divide the frequency of the control signal by the second predetermined constant (N) contained in the storage circuit 26.

There is a great variety of counting circuits commerically available which may be used for the counter circuits 14, 20 and 24. Further, as will be appreciated by those who are skilled in the art, the storage circuits 16, 22 and 26 may be designed according to any one of a number of embodiments which are compatible with a particular counter. A single divisor may be designed into the system; or as will be described later, the storage circuits may be designed to selectively accommodate a number of divisors.

The command counter 24 contains an add/delete circuit 28 which is responsive to the digital signals on lines 30 and 32 from a pulse generator 34. The pulse generator 34 is a standard part of a numerical control system. Numerical control systems are well-known in the art, and the type of numerical control used is not a limitation on the invention. The pulse generator may correspond to an interpolator circuit or other pulse source which responds to input information on line 35 and produces digital signals on line 30 to command motion in one direction and digital signals on line 32 to command motion in the opposite direction.

The add/delete circuit 28 is operative to add or delete a pulse from the analogue command signal produced by the counter 24 thereby shifting the phase of the analogue command signal with respect to the analogue reference signal. The shift in phase between the analogue command signal and the analogue reference signal represents an analogue output signal. A phase shift of 360 electrical degrees between the command and reference signals defines the electrical pitch of the analogue output signal which corresponds to the electrical pitch of the feedback system as described earlier. The analog reference signal is an input to a sine/cosine generator 40 which produces sine and cosine signals to a feedback element 42 coupled to a movable element 44. The feedback element produces a feedback signal on an output line 46 which is shifted in phase with respect to the input signal to the feedback element as a function of the displacement of the movable element. The feedback signal and the command signal are inputs to a phase discriminator 48 which produces an error signal on the line 50 as a function of the difference between its input signals. The error signal is an input to a servo-amplifier 51 which energizes the servo-motor 52. The servo-motor drives the movable element 44 in a direction to reduce the error signal to zero.

In order to obtain a high gain, narrow band width feedback system, it is desirable to maintain the frequencies of the feedback and command signals constant. As illustrated in FIG. 1, the invention provides a system having means for varying the divisors (M) and (N) to obtain a plurality of resolutions while maintaining the frequencies of the feedback and command signals constant.

In theory, the ability to vary the divisors in this way is enough to switch between the English and Metric systems. However, in practice, the lowest common multiple of the divisors necessary to achieve two such values is such a large number that the clock frequency is too high. This problem may be overcome in a development of the invention which has means for varying the divisors (M) and (N) as well as the clock frequency. Further, these three variables may be chosen to preserve a constant value for the frequency of the feedback and command signals. The frequency of these signals is equal to the frequency of the clock pulses divided by the product of the divisors (M) and (N).

The invention will further be explained giving an example where one wishes to switch the resolutions of the system between inch and metric units. Since the number of millimeters (mm) in an inch is exactly 25.4, it is possible to make the frequency of the commmand and reference signals constant even though the resolution of the system may be switched between inch and metric values. One stipulation to such a switchable system, using the disclosed invention, is that the electrical pitch (E) is in inch values. Such a switchable system will be further explained below.

A typical carrier frequency ($F_c$) for the reference and the command signals, which is suitable for a resolver, is 2500 Hz; and therefore, it is required to maintain the quotient of the frequency of the clock pulses divided by the product of the divisors equal to 2500 Hz. It is readily seen that this condition is preserved in the following example.

a. $F_c = 5$ MHz $M = 10$ $N = 200$
b. $F_c = 5$ MHz $M = 2$ $N = 1000$
c. $F_c = 6.35$ MHz $M = 5$ $N = 508$
d. $F_c = 6.35$ MHz $M = 1$ $N = 2540$

It can be seen that the resolution (B) is given by (B) equal E/N, regardless of the values of $F_c$ and $M$. If the electrical resolution E equals 0.2 inches, the following resolutions are obtained.

a. $N = 200$ $B = 0.2$ inches/200 = 0.001 inches
b. $N = 1000$ $B = 0.2$ inches/1000 = 0.0002 inches
c. $N = 508$ $B = 0.2$ inches/508 = 25.4 (0.2mm)/508 = 0.01mm
d. $N = 2540$ $B = 0.2$ inches/2540 = (25.4) 0.2mm/2540 = 0.002mm More or fewer options than those listed above can obviously be provided, and a value for N suitable for a rotational axis can be established. If a resolution of one degree is required, $N = 360$ and $M$ can be 6. The frequency of the clock pulses must then be (2500) (6) (360) = 5.4 MHz.

Figure 2:
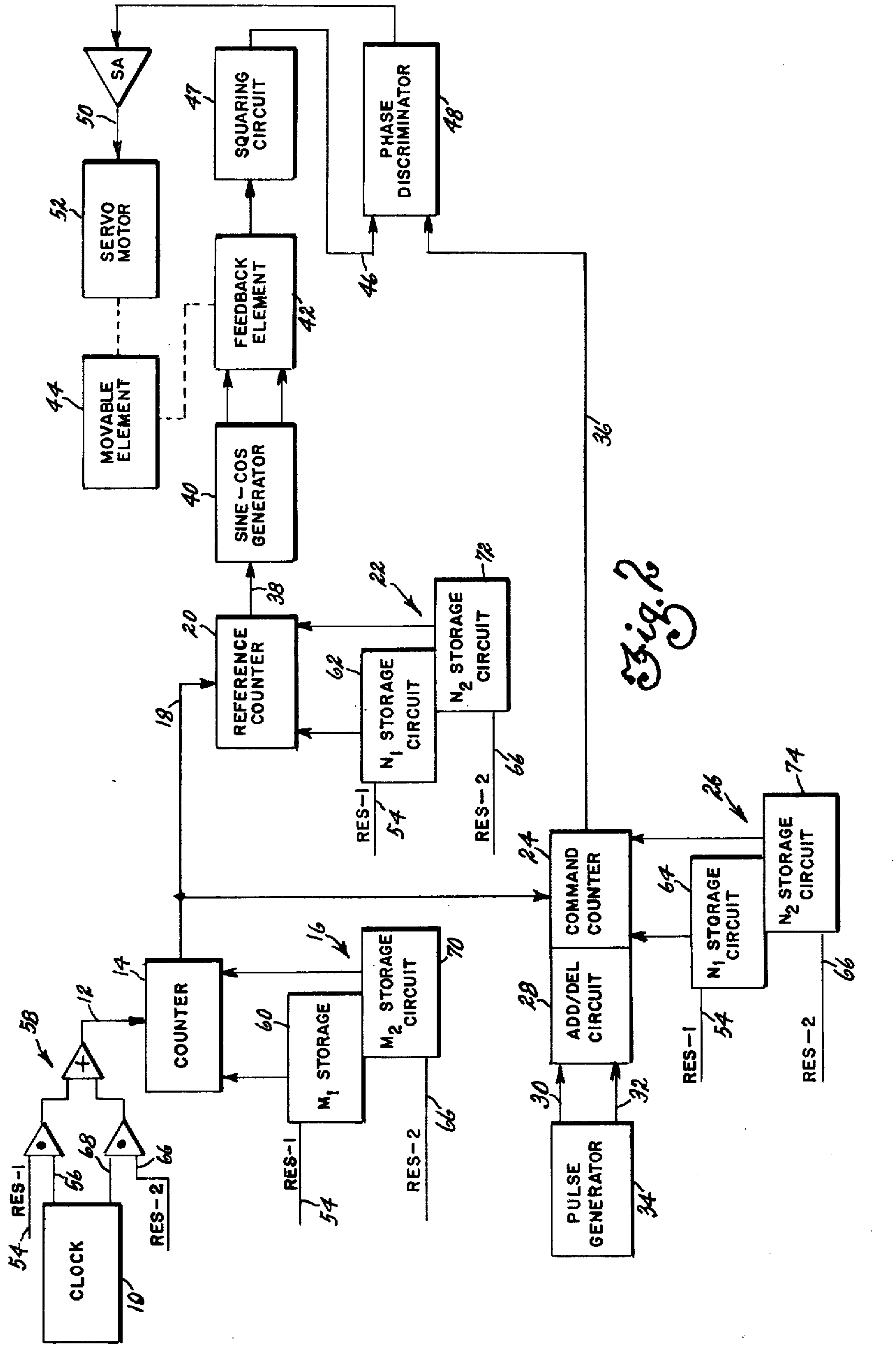
FIG. 2 is a detailed block diagram illustrating a system wherein the invention is selectively responsive to input signals of different resolutions.

FIG. 2 illustrates a system similar to that of FIG. 1, with the exception that the system is selectively responsive to digital signals from the pulse generator representing two differenct resolutions. Referring to the examples cited earlier, assume one wished to program in switchable inch and metric resolutions; further assume that the desired resolutions correspond to the examples in subparagraph (*b*) and subparagraph (*d*), or 0.0002 inches and 0.002 millimeters respectively. The desired resolutions may be energized by a switch on a control panel of the numerical control or by a particular tape code. If a resolution of 0.0002 inches were chosen a signal on line 54 corresponding to RES-1 would appear. First, a frequency of 5 MHz on output 56 from the clock 10 would pass through the gating network 58 to the counter 14. The constant $M_1 = 2$ located in the storage circuit 60 would set the divisor $M_1$ in the counter 14 and divide the frequency on line 56 by 2. Further, the constant $N_1 = 1000$ located in storage circuits 62 and 64 would be set in the reference counter 20 and command counter 24 respectively. These counters would be operative to divide the control signal on line 18 by 1000 and produce an analogue reference signal on line 38 and an analogue command signal on line 36 having a frequency of 2.5 KHz.

In a similar manner, if a resolution of 0.002 mm were desired, a switching signal RES-2 would appear on line 66. A clock frequency of 6.35 Mhz on output 68 of the clock 10 would pass to the counter 14 and be divided by the constant $M_2 = 1$ located in the storage circuit 70. The resultant frequency of the control and the command counter 24 by the constant $N_2 = 2540$ located in storage circuits 72 and 74 thereby producing a reference signal on line 38 and command signal on line 36 having a frequency of 2.5 KHz.

One further point should be noted at this time, in examples (*a*) through (*d*), the electrical pitch $E = 0.2$ inches and the ability to select two difference clock frequencies and different divisors M and N allows both inch and metric values to be chosen. Since the reciprocal of 25.4 is non-integral, it is not possible to select inch increments if the electrical pitch E is metric. However, if a machine has a metric lead screw, it is still a simple matter to use gearing between the lead screw and the feedback element such that the electrical pitch becomes an inch value; and a switchable inch/metric system is then possible. Similarly, if a basic metric machine with linear resolvers is used, the resolvers can have, for example, 0.2 inches electrical pitch if it is desired to program both inch and metric increments.

Figure 3:
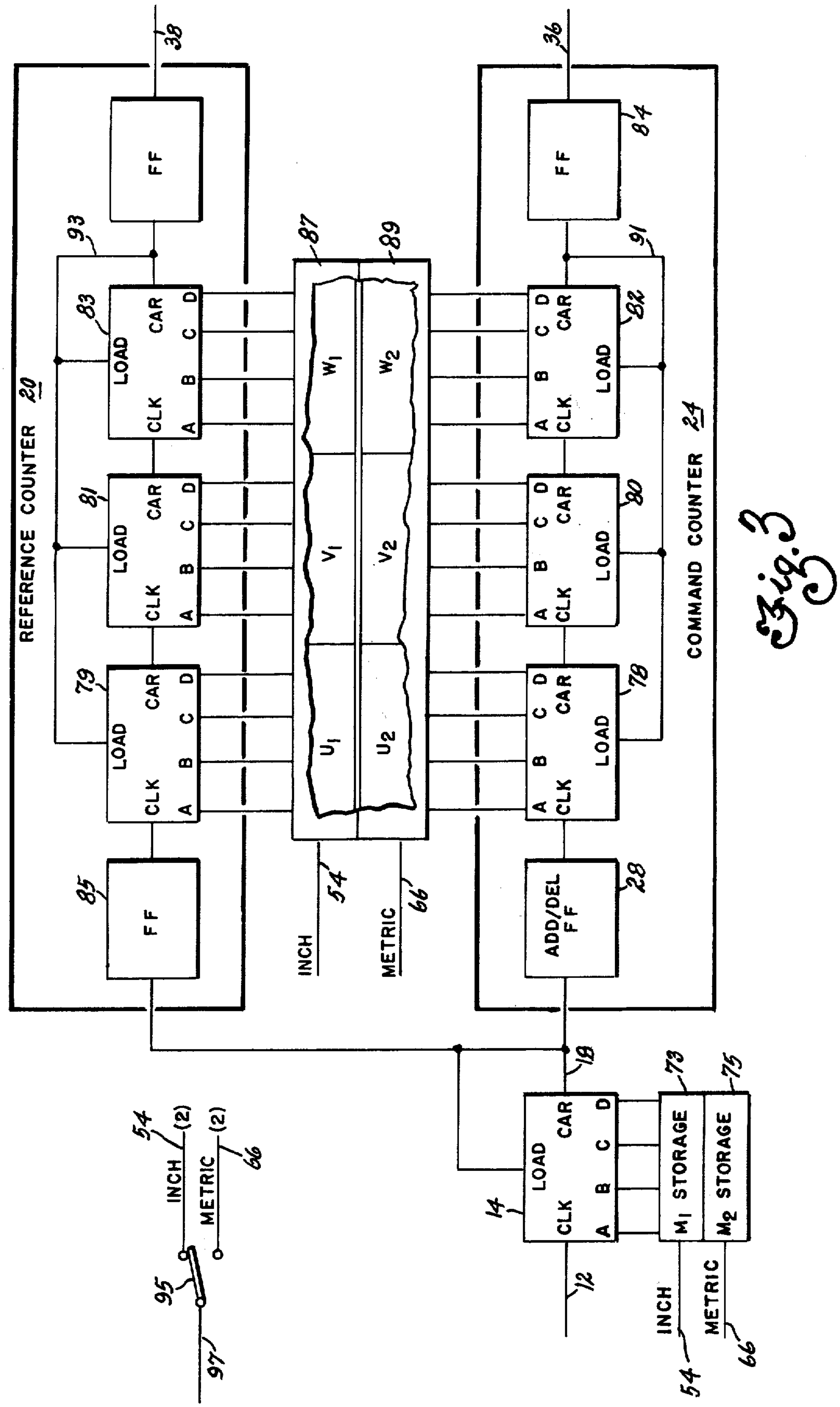
FIG. 3 illustrates the component parts of the digital to analogue converter comprising the invention.

FIG. 3 illustrates one example of the components that may be used for the digital to analogue converter comprising the invention. The heart of the counters is a commercially available synchronous four-bit, i.e., divide by 16, counter. A single such counter comprises the M-counter 14. This counter has four data imputs A, B, C and D weighted 8, 4, 2, and 1, respectively; and the counter may preset to any value from 0 to 15 by means of these data inputs and a signal on the LOAD input.

If only a single divisor is required, the data inputs may be permanently wired to represent a value of $(16 - M)$; and this value will be preset in the counter in response to signal on the LOAD input. The counter then counts up in response to every clock pulse until a signal is generated on the CAR output. This signal represents an output from the counter and may be used to reload the prewired divisor back into the counter.

Associated with the M-counter 14 is an $M_1$ store 73 and $M_2$ store 75. Each store may be comprised of a number of two input AND gates — one gate for each counter data input. One input to each gate would be used to determine the divisor $(16 - M)$, and the other input would be responsive to a corresponding gating signal, e.g. inch or metric. Consequently, the store 73 would contain a value representing $(16 - M_1)$, and the store 75 would contain a value representing $(16 - M_2)$. Depending on which resolution was chosen, the appropriate divisors would be initially loaded in the counter 14; and in response to the clock pulses on line 12, the counter would produce an overflow pulse after every $M_1$ or $M_2$ clock pulses. The overflow pulses would be operative to reload the divisor into the counter via the counter LOAD input.

The same principal extends to the counters 20 and 24 which contain three cascade counters 78, 80 and 82 and 79, 81 and 83, respectively. Each of these counters is identical to the counter 14. With the exception that the divide by two stage 85 of counter 20 does not contain add/delete gating, the counters 20 and 24 are identical; and therefore, only the operation of counter 24 will be described in detail.

The first stage 28 of the counter 24 is a divide by two stage containing add/delete gating. The last stage in the counter 24 is another divide by two stage 84 which insures that the output wave form has a mark-space ratio of unity. Because of the stages 28 and 84, the constant N must always be an integral multiple of four. Consequently, the constant which is determined by counters 78, 80 and 82 is $N' = N/4$; and the manner in which the counter is programmed allows $N'$ to be set to any value from 1 to $16^3$.

To this end, the storage circuits 87 and 89 contain three four-bit numbers (U, V and W) which are loaded into the counters 78, 80 and 82 respectively, whenever the counter 24 produces an overflow pulse on the output line 91. It should be noted that the $N_1$ store 87 and the $N_2$ store 89 may be simple gating circuits similar to the M-stores 73 and 75 earlier described. Further, the data inputs in the counters 20 and 24 may be loaded in parallel from the stores 87 and 89. Therefore, only a single set of stores is required for the counters 20 and 24.

The counter 78 produces a first overflow after $(16 - U)$ pulses are received and thereafter produces an overflow pulse after every 16 input pulses. The counter 80 produces a first overflow pulse after $(16 - V)$ input pulses thereto and thereafter produces an overflow pulse after every 16 input pulses thereto or after every 256 input pulses to the counter 78. The counter 82 produces an overflow pulse after $(16 - W)$ input pulses thereto. Then the constants are reloaded in the counters and the count cycle starts again. Derivation of the constant $N'$ is given by the following equation.

$$N' = (16 - U) + (16 - V - 1)\,16 + (16 - W - 1)\,256$$
$$N' = (16 - U) + (15 - V)\,16 + (15 - W)\,256$$

The required values for U, V and W can thus be tabulated as follows:

| | N | N' | U | V | W |
|---|---|---|---|---|---|
| (a) | 200 | 50 | 14 | 12 | 15 |
| (b) | 1000 | 250 | 6 | 0 | 15 |
| (c) | 508 | 127 | 1 | 8 | 15 |
| (d) | 2540 | 635 | 5 | 8 | 13 |

As mentioned earlier, if a machine should be required to operate only with one set of M and N values, the stores may be simply wired connections for applying the required constants to the data inputs of the counters 14, 20 and 24 in response to the pulses on lines 18, 93 and 91 respectively. However, a common situation is that of a machine tool requiring switching between two different resolutions, one in the English system and one in the metric system. Thus, it may be required to switch between the examples (a) and (c) or between (b) and (d).

In this case, the system may be provided with a two position switch 95 which responds to a signal on line 97 and in the inch setting places a true signal on line 54. As shown in FIG. 2, the switch 95 is operative to gate the appropriate clock frequency from the clock 10 to the line 12. The signal on line 54 and the overflow pulses on line 18 are operative to set the value $(16 - M_1)$ in the counter 14. The inch signal on line 54 is further operative in combination with the overflow pulses on lines 91 and 93 to set the values $(16 - U_1)$, $(16 - V_1)$, and $(16 - W_1)$ in the counters 24 and 20 respectively. When the two position switch is in the METRIC position, the signal on line 66 is operative to gate the appropriate clock pulses from the clock 10 on the line 12. The signal on line 66 is also operative with the overflow pulses on line 18 to set the value $(16 - M_2)$ in the counter 14. The gating signal on line 66 is further operative with the overflow pulses on lines 91 and 93 to set the appropriate values of $(16 - U_2)$, $(16 - V_2)$ and $(16 - W_2)$ in the counters 24 and 20, respectively.

The operator can thus switch instantaneously from inch to metric and vice versa which is a great advantage if, as is sometimes the case, he is working from a drawing having some dimensions in inches and some in millimeters.

The storage circuits 73, 75, 87 and 89 can be wired for selecting any one of the four possibilities in the examples (a) through (d) or any of more possibilities to suit a machine tool in question.

It should be noted that the system does not need to by synchronized with the numerical control pulse generator 34. The clock source 10 can therefore be completely independent from the clock source utilized in the pulse generator portion of the numerical control.

It should also be noted that the known principle of range extention can be freely employed in the system. In range extention, the electrical pitch is effectively multiplied by a factor which allows the servo-motor to operate with a correspondingly increased follow-up lag without slipping a pitch. Any known range extention circuit may be employed.

It should be noted that the pulse generator 34 of the numerical control always operates in increments of whatever system is commanded and that the readout dial of the control accordingly reads correctly in the inch or metric system actually in use. This is in contrast to a known system in which an inch machine is converted to metric by scaling the pulses produced by the interpolator. The readout dials then read inches whether inch or metric increments are employed, which is confusing to the operator.

It will be appreciated that the frequency of the command and reference signals can be fixed independently of the clock frequency of the numerical control system and can thus be assigned that value which engineering criteria dictates is best. The command pulses from the numerical control system can be asynchronous with respect to the clock pulses and the circuit performs a resynchronizing operation automatically.

Figure 4:
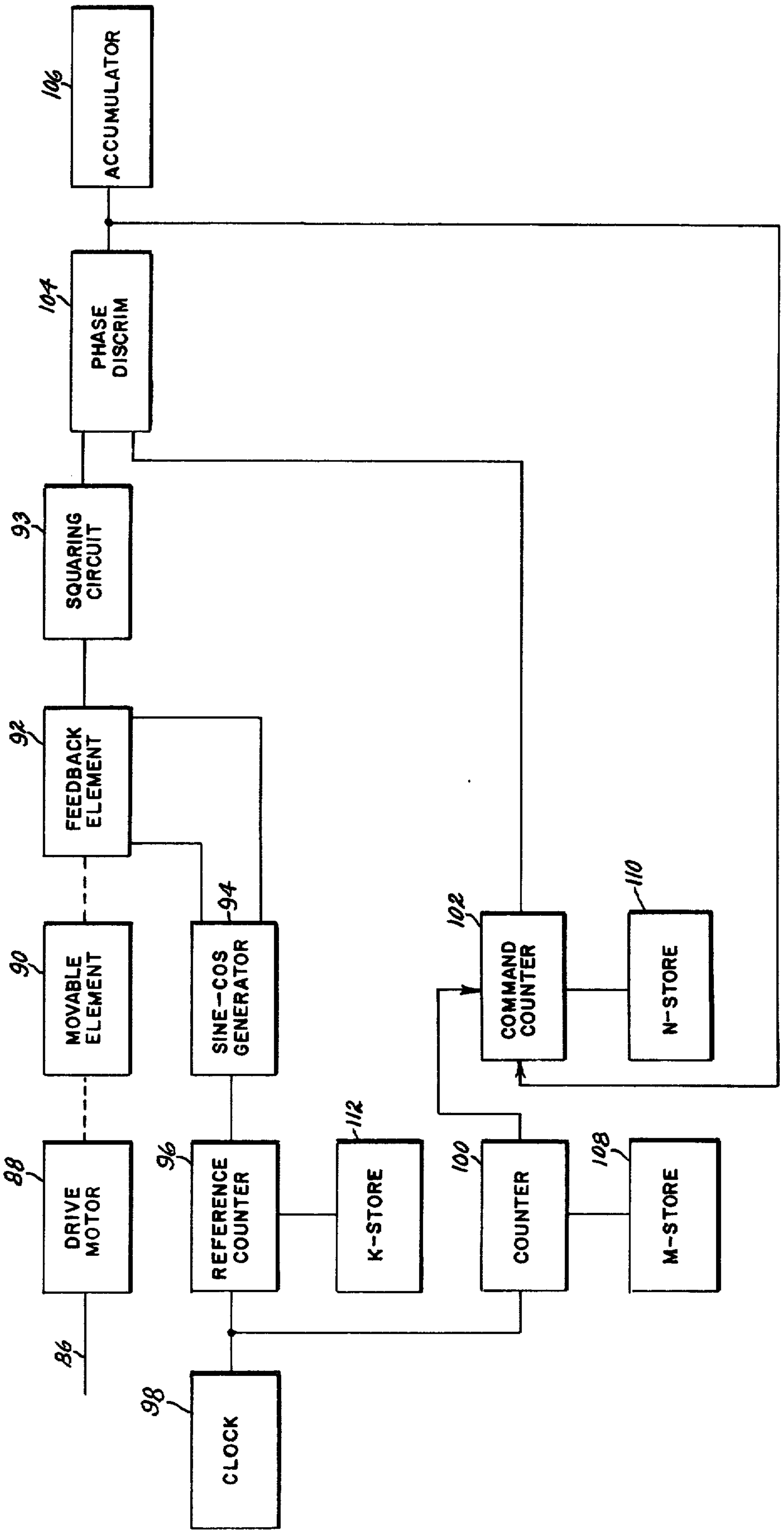
FIG. 4 illustrates an alternative embodiment and application of the invention.

FIG. 4 illustrates an alternative construction and an alternative application of the invention. The invention may be used in a numerical control which does not have a closed loop feedback system. In such a case, drive pulses on line 86 energize a drive motor 88 which controls the motion of a movable element 90. In many applications, it is desirable to measure the motion of the movable element. Further, there are situations where different resolutions of the measuring system are required.

To implement such a measuring system, a feedback element 92 is mechanically coupled to the movable element and is responsive to sine and cosine signals from a sine/cosine generator 94. The generator 94 is driven by an analogue reference signal produced from a reference counter 96. The reference counter 96 is responsive to a source of clock pulses 98 which also supply a counter 100 which produces a control signal on an output thereof. A command counter 102 is responsive to the control signal and produces a command signal to a phase discriminator 104. The phase discriminator is responsive to the command signal and a feedback signal from the feedback element 92 and produces a signal on the output thereof which represents the motion of the movable element 90. An accumulator 106 is responsive to the output signal from the discriminator 104, and it may visually display the motion of the element 90. The output of the phase discriminator is also fed back to the command counter 102 which has an add/delete circuit on an input stage thereof. The command counter then adds or deletes a pulse from its command signal in accordance with the output from the phase discriminator. Consequently the phase of the command signal is driven into a coincidence with the feedback signal.

As earlier described, in order to accommodate different resolutions, the counters 96, 100 and 102 are variable modulo counters. Again, depending on the resolution desired, the counter 100 will divide the frequency of the clock pulses by first predetermined constant $M$ stored in the circuit 108; and the command counter 102 will divide the frequency of the control signal by a second predetermined constant $N$ stored in the circuit 110. In this alternative embodiment, the reference counter divides the frequency of the clock pulses by a third predetermined constant $K$ which is stored in the storage circuit 112. The constant $K$ must be equal to the product of the constants $M$ and $N$. The operation of the circuits shown in FIG. 3 is similar to the operation of the circuits described with reference to FIGS. 1 and 2.

It is further possible to select any whole number of command pulses to correspond to 360°phase change of the command signal. If the whole number is $n$, each command pulse is used to produce four move pulses for application to the add/delete circuit. $N$ is made equal to $4n$ and the required conditions are established. The ability to select different whole numbers; e.g., those appropriate to increments of 10 microns and 0.001 inches in a system of 0.2 inches per 360° phase of the command signal has fully been explained. In addition, known methods for extending the permissible servo error beyond the 360° remain valid. The control of the division ratios can be carried out by any convenient numerical system; e.g., the hexadecimal system as in the embodiment described or in binary.

While the invention has been illustrated in some detail, according to the preferred embodiments shown in the accompanying drawings and while the preferred illustrated embodiments have been described in some detail, there is no intention to thus limit the invention to such detail. On the contrary, it is intended to cover all modifications, alterations and equivalents falling within the spirit and the scope of the appended claims.

What is claimed is:

1. A digital-to-analogue converter comprised in part of first and second counter circuits responsive to a source of clock pulses for producing an analogue reference signal of a constant predetermined frequency and an analogue command signal of the constant predetermined frequency, said second counter circuit including a circuit responsive to a digital input signal for changing the phase relationship of the command signal with respect to the reference signal, said phase relationship representing an analogue output signal, wherein the improvement comprises:

a. means connected between the source of clock pulses and the first counter circuit for scaling the frequency of the clock pulses to produce control pulses;

b. means connected to the first and second counter circuits for loading said first and second counter circuits with a first divisor signal representing a first predetermined number to cause said first and second counter circuits to produce the command and reference signals by dividing the frequency of the control pulses by the first predetermined number, said first predetermined number being chosen as a function of a predetermined resolution of the digital input signal and a predetermined electrical pitch of the analogue output signal; and c. means connected to the scaling means for loading the scaling means with a second divisor signal representing a second predetermined number to cause the scaling means to divide the frequency of the clock pulses by the second predetermined number, said first and second predetermined numbers being chosen such that the ratio of the frequency of the clock pulses to the product of the first and second predetermined numbers is equal to the constant predetermined frequency.

2. A digital-to-analogue converter comprised in part of first and second counter circuits responsive to a source of clock pulses for producing an analogue reference signal of a constant predetermined frequency and an analogue command signal of the constant predetermined frequency, said second counter circuit including a circuit responsive to a digital input signal for changing the phase relationship of the command signal with respect to the reference signal, said phase relationship representing an analogue output signal, wherein the improvement comprises:

a. means connected to the first counter circuit for loading the first counter circuit with a first divisor signal representing a first predetermined number to cause said first counter circuit to produce the reference signal by dividing the frequency of the clock pulses by said first predetermined number, said first predetermined number being chosen such that the ratio of the frequency of the clock pulses to the first predetermined number is equal to the constant predetermined frequency;

b. means connected between the source of clock pulses and the second counter circuit for scaling the frequency of the clock pulses to produce a digital control signal;

c. means connected to the second counter circuit for loading the second counter circuit with a second divisor signal representing a second predetermined number to cause said second counter circuit to produce the command signal by dividing the frequency of the digital control signal by the second predetermined number, said second predetermined number being chosen as a function of a predetermined resolution of the digital input signal and a predetermined electrical pitch of the analogue output signal; and d. means connected to the scaling means for loading the scaling means with a third divisor signal representing a third predetermined number to cause said scaling means to produce the digital control signal by dividing the frequency of the clock pulses by said third predetermined number, said second and third predetermined numbers being chosen such that the product of the second and third predetermined numbers is equal to the first predetermined number.

3. An apparatus selectively responsive to first and second digital input signals representing input information relative to first and second resolutions, respectively, for producing first and second analogue output signals having first and second electrical pitches and representing said input information relative thereto, the apparatus comprising:

a. means for selectively supplying first and second gating signals as a function of said first and second digital input signals, respectively;

b. a source of clock pulses having a predetermined frequency;

c. means connected to the source of clock pulses for scaling the frequency of the clock pulses to produce first and second control signals;

d. a first counter circuit responsive to the first and second control signals for producing first and second analogue reference signals having a constant predetermined frequency;

e. a second counter circuit responsive to the first and second control signals and the digital input signals for producing first and second analogue command signals having the constant predetermined frequency, said second counter circuit including means for varying the phase of a command signal with respect to a corresponding reference signal in response to one of the digital input signals whereby the phase difference between the command signal and the reference signal represents one of the analogue output signals;

f. means responsive to the first and second gating signals and connected to the first and second counter circuits for causing the first and second counter circuits to selectively divide 1. the frequency of the first control signal by a first predetermined number in response to the first gating signal to produce the first command and reference signals, and 2. the frequency of the second control signal by a second predetermined number in response to the second gating signal to produce the second command and reference signals, said first predetermined number being chosen as a function of the ratio of the first electrical pitch to the first resolution, and said second predetermined number being chosen as a function of the ratio of the second electrical pitch to the second resolution; and g. means responsive to the first and second gating signals and connected to the scaling means for causing the scaling means to divide 1. the frequency of the clock pulses by a third predetermined number in response to the first gating signal to produce the first control signal, and 2. the frequency of the clock pulses by a fourth predetermined number in response to the second gating signal to produce the second control signal, said predetermined numbers being chosen such that the ratio of the frequency of the clock pulses to the first and third predetermined numbers equals the constant predetermined frequency and the ratio of the frequency of the clock pulses to the second and fourth predetermined numbers equals the constant predetermined frequency.

4. An apparatus responsive to a first digital input signal respresenting input information relative to a first resolution, for selectively producing first and second analogue output signals having first and second electrical pitches and representing said input information relative thereto, the apparatus comprising:

a. means for selectively supplying first and second gating signals as a function of said first and second electrical pitches, respectively;

b. a source of clock pulses having a predetermined frequency;

c. means connected to the source of clock pulses for scaling the frequency of the clock pulses to produce first and second control signals;

d. a first counter circuit responsive to the first and second control signals for producing first and second analogue reference signals having a constant predetermined frequency;

e. a second counter circuit responsive to the first and second control signals and the digital input signals for producing first and second analogue command signals having the constant predetermined frequency, said second counter circuit including means for varying the phase of a command signal with respect to a corresponding reference signal in response to one of the digital input signals whereby the phase difference between the command signal and the reference signal represents one of the analogue output signals;

f. means responsive to the first and second gating signals and connected to the first and second counter circuits for causing the first and second counter circuits to selectively divide 1. the frequency of the first control signal by a first predetermined number in response to the first gating signal to produce the first command and reference signals, and 2. the frequency of the second control signal by a second predetermined number in response to the second gating signal to produce the second command and reference signals, said first predetermined number being chosen as a function of the ratio of the first electrical pitch to the first resolution, and said second predetermined number being chosen as a function of the ratio of the second electrical pitch to the first resolution; and g. means responsive to the first and second gating signals and connected to the scaling means for causing the scaling means to divide 1. the frequency of the clock pulses by a third predetermined number in response to the first gating signal to produce the first control signal, and 2. the frequency of the clock pulses by a fourth predetermined number in response to the second gating signal to produce the second control signal, said predetermined numbers being chosen such that the ratio of the frequency of the clock pulses to the first and third predetermined numbers equals the constant predetermined frequency and the ratio of the frequency of the clock pulses to the second and fourth predetermined numbers equals the constant predetermined frequency.

5. An apparatus selectively responsive to first and second digital input signals representing input information relative to first and second resolutions, respectively, for producing first and second analogue output signals having a constant electrical pitch and representing said input information relative to said constant electrical pitch, the apparatus comprising:

a. means for selectively supplying first and second gating signals as a function of said first and second resolutions, respectively;

b. first and second sources of clock pulses having first and second predetermined frequencies;

c. means connected to the first and second sources of clock pulses for scaling the first and second frequencies of the clock pulses to produce first and second control signals, respectively;

d. a first counter circuit responsive to the first and second control signals for selectively generating first and second analogue reference signals, respectively, having a constant predetermined frequency;

e. a second counter circuit responsive to the first and second control signals and the first and second digital input signals for producing first and second analogue command signals, respectively, having the constant predetermined frequency, said second counter circuit including means for varying the phase of a command signal with respect to a corresponding reference signal in response to a digital input signal whereby said phase difference between the command and reference signals represents an analogue output signal; and f. means responsive to the first and second gating signals and connected to the first and second counter circuits for loading said first and second counter circuits with 1. a first divisor signal representing a first predetermined number in response to the first gating signal to cause the first and second counter circuits to produce the first reference and command signals by dividing the frequency of the first control signal by the first predetermined number, and 2. a second divisor signal representing a second predetermined number in response to the second gating signal to cause said first and second counter circuits to produce the second reference and command signals by dividing the frequency of the second control signal by the second predetermined number, said first and second predetermined numbers being chosen as a function of the ratios of the first and second resolutions to the constant electrical pitch, respectively; and g. means responsive to the first and second gating signals and connected to the scaling means for loading the scaling means with 1. a third divisor signal representing a third predetermined number in response to the first gating signal to cause the dividing means to divide the frequency of the first source of clock pulses by the third predetermined number to produce the first control signal, and 2. a fourth divisor signal representing a fourth predetermined number in response to the second gating signal for causing the dividing means to divide the frequency of the second source of clock pulses by the fourth predetermined number to produce the second control signal, said predetermined numbers being chosen such that the ratio of the first predetermined frequency to the product of the first and third predetermined numbers is equal to the constant predetermined frequency and the ratio of the second predetermined frequency to the product of the second and fourth predetermined numbers is equal to the constant predetermined frequency.

6. A numerical control of the type responsive to a first input signal defining a first dimensional resolution with respect to inch units and a second input signal defining a second dimensional resolution with respect to metric units, said control comprised in part of a pulse generator producing first and second digital signals corresponding to the input signals, a feedback element responsive to a reference signal for producing a feedback signal of a constant predetermined frequency and having a predetermined electrical pitch representing motion of a movable element with respect to inch units and a phase discriminator circuit responsive to the feedback signal and a command signal for producing an error signal to control a drive mechanism coupled to the movable element, wherein the improvement comprises:

a. a source of clock pulses;

b. a first variable modulo counting means responsive to the clock pulses and the digital signals for selectively producing a first control signal in response to the first digital signal and a second control signal in response to the second digital signal;

c. a second variable modulo counting means responsive to the control signals and the digital signals for selectively producing a first reference signal of the constant predetermined frequency in response to the first digital signal and a second reference signal of the constant predetermined frequency in response to the second digital signal; and d. a third variable modulo counting means responsive to the control signals and the digital signals for selectively producing a first command signal of the constant predetermined frequency in response to the first digital signal and a second command signal of the constant predetermined frequency in response to the second digital signal, said third modulo counting means including means responsive to the digital signals for changing the phase of the command signals with respect to the reference signals in response to the digital signals, said modulo numbers for the second and third counting means being chosen in response to the digital signals as a function of the ratio of the electrical pitch to the dimensional resolutions of the input signals, and said modulo number for the first counting means being chosen to maintain the frequency of the command signals and the reference signals equal to the constant predetermined frequency in response to each of the input signals.

7. The apparatus of claim 6, wherein the control further comprises a switching means for producing a first switching signal in response to the first digital signal and a second switching signal in response to the second digital signal.

8. The apparatus of claim 7, wherein the source of clock pulses further comprises:

a. first means responsive to the first switching signal for supplying first clock pulses having a first predetermined frequency; and b. second means responsive to the second switching signal for supplying second clock pulses having a second predetermined frequency.

9. The apparatus of claim 8, wherein the second variable modulo counting means further comprises:

a. a second counter changing state in response to each period of the control signals;

b. means connected to the second counter for setting a first modulo in the second counter in response to the first switching signal and resetting the first modulo in response to a predetermined state of the second counter, said first modulo being equal to the ratio of the predetermined electrical pitch to the first dimensional resolution; and c. means connected to the second counter for setting a second modulo in the second counter in response to the second switching signal and resetting the second modulo in response to the predetermined state of the second counter, said second modulo being equal to the ratio of the predetermined electrical pitch to the second dimensional resolution.

10. The apparatus of claim 9, wherein the third variable modulo counting means further comprises:

a. a third counter changing state in response to each period of the control signals, said third counter circuit further including a first counter stage responsive to the digital signals for incrementally changing the phase of a command signal with respect to a corresponding reference signal in response to the sign of a digital signal;

b. means connected to the third counter for setting the first modulo in the third counter in response to the first switching signal and resetting the first modulo in response to a predetermined state of the third counter; and c. means connected to the third counter for setting the second modulo in the third counter in response to the second switching signal and resetting the second modulo in response to the predetermined state of the third counter.

11. The apparatus of claim 10, wherein the first variable modulo counting means further comprises:

a. a first counter circuit being connected serially between the first supplying means and the second and third counter circuits in response to the first switching signal and between the second supplying means and the second and third counter circuits in response to the second switching signal, said counter changing state in response to each period of said clock pulses;

b. means connected to the first counter circuit for setting a third modulo in the first counter in response to the first switching signal and resetting the third modulo in response to a predetermined state of said first counter, said third modulo being equal to the ratio of the first predetermined frequency to the product of the predetermined constant frequency and the first modulo; and c. means connected to the first counter for setting a fourth modulo in the first counter in response to the second switching signal and resetting the fourth modulo in response to the predetermined state of the first counter, said fourth modulo being equal to the ratio of the second predetermined frequency to the product of the predetermined constant frequency and the second modulo.

* * * * *